METHOD OF MAKING INDUCTANCE COILS

Filed March 21, 1955

4 Sheets-Sheet 1

Inventor
Harold T. Lyman
By
Ooms, McDougall, Williams & Hersh
Attorneys

Nov. 29, 1960 H. T. LYMAN 2,961,747

METHOD OF MAKING INDUCTANCE COILS

Filed March 21, 1955

4 Sheets-Sheet 2

Inventor
Harold T. Lyman

By
Ooms, McDougall, Williams & Hersh
attorneys

Nov. 29, 1960 H. T. LYMAN 2,961,747

METHOD OF MAKING INDUCTANCE COILS

Filed March 21, 1955 4 Sheets-Sheet 3

Inventor
Harold T. Lyman

By Ooms, McDougall, Williams & Hersh
Attorneys

Inventor
Harold T. Lyman
By Ooms, McDougall, Williams & Hersh
Attorney.

United States Patent Office 2,961,747

Patented Nov. 29, 1960

2,961,747

METHOD OF MAKING INDUCTANCE COILS

Harold T. Lyman, Milford, Conn., assignor to Aladdin Industries, Incorporated, Nashville, Tenn., a corporation of Illinois Filed Mar. 21, 1955, Ser. No. 495,631

5 Claims. (Cl. 29—155.57)

This invention relates to new and improved methods of making inductance coils and to the improved coils themselves, resulting from the methods.

One principal object of the invention is to provide an improved method of making multi-layer inductance coils while providing for the utilization of circuit-printing techniques to form the conductors of the coils.

A further object of the invention is to provide an improved method in which a conductor is applied to a length of tape by circuit-printing techniques, whereupon the tape is coiled into a roll to form an inductance coil.

It is a further object of the invention to provide a method of the foregoing character in which the tape is largely removed, after it has served its initial purpose of supporting the conductor during the coiling operation, while the conductor and elements of the tape between adjacent turns thereof are left in the finished coil.

Another object of the invention is to provide a method of the foregoing character in which adhesive is employed in a novel manner to support the finished coil, while permitting a large portion of the tape to be dissolved away.

Thus, it is an object to provide an improved method of making multi-layer printed coils having a high factor of merit, or "Q," together with low distributed capacitance.

A further object is to provide improved, low cost printed multi-layer coils having a minimum of dielectric material between the turns thereof so as to secure superior electrical characteristics.

Further objects and advantages of the invention will appear from the following description, taken with the accompanying drawings, in which.

In general, all of the exemplary methods to be described below contemplate applying a conductor to an insulated tape by suitable circuit-printing techniques. Adhesive is applied to the opposite side of the tap. The tape is then wound or coiled into a roll. The adhesive forms a bond between adjacent layers of the roll and thereby maintains the tape in coiled position. A solvent is then applied to the roll so as to dissolve away most of the supporting tape. However, certain small portions of the tape are left, together with various portions of the adhesive, to support the conductor and provide insulation between adjacent turns of the finished coil. The amount of adhesive and insulating material left in the finished coil is sufficient to maintain its mechanical integrity without materially increasing the distributed capacitance of the coil. Likewise, the amount of dielectric material remaining in the finished coil does not appreciably reduce the "Q" of the coil.

Figure 1:
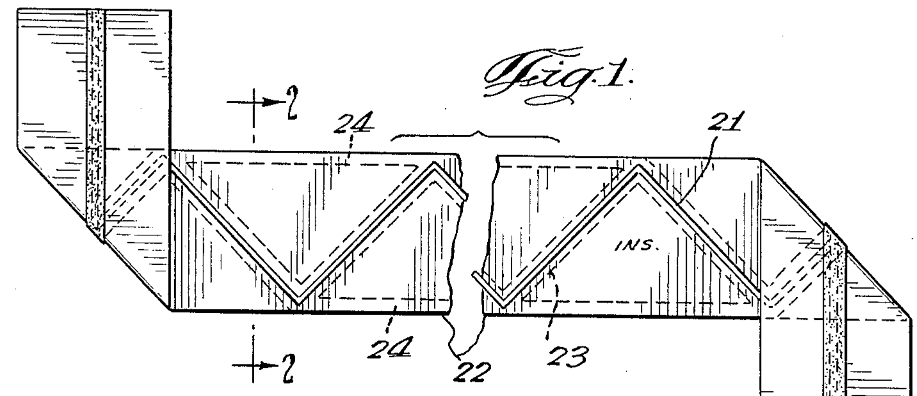
Figure 1 is a plan view of an insulating tape carrying a printed ribbon conductor and adhesive elements, all as employed in a first exemplary method, serving to illustrate the invention.
Figure 2:
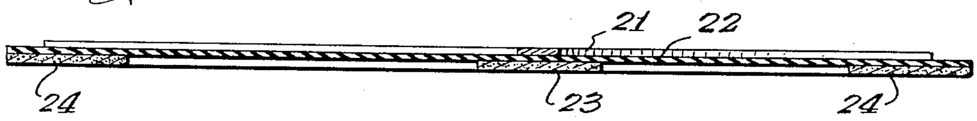
Fig. 2 is an enlarged somewhat diagrammatic cross-sectional view taken generally along a line 2—2 of Fig. 1.

The first exemplary method to be described is illustrated in Figs. 1–6. Fig. 1 illustrates a thin, narrow, ribbonlike conductor 21 carried on one side of a thin insulating tape 22. In this instance, the ribbon conductor 21 follows a zigzag pattern, or, in other words, repeatedly traverses the width of the tape 22 as it progresses along the length of the tape. It will be recognized that the zigzag pattern assumed by the conductor 21 is similar to that followed by a wire in a universally wound coil. In such a coil the wire repeatedly traverses the width of the coil as it spirals outwardly to form the successive layers of the coil. It will be understood, however, that the conductor 21 may be applied in any desired pattern to the supporting tape 22.

The tape 22 may be made of various flexible insulating materials but preferably is made of a synthetic resinous plastic material. Polyethylene is one suitable material for the tape 22.

The tape 22 may be extremely thin, since it serves merely as a temporary support for the ribbon conductor 21. For example, tape only $\frac{1}{1000}$ of an inch in thickness may be employed, although thicker tape may be used as desired.

The ribbon conductor 21 is applied to the supporting tape 22 in the desired pattern by circuit-printing techniques. Such techniques are well known and need not be described herein. Moreover, they form no part of the present invention.

It will be of interest, however, to note that highly suitable photographic circuit-printing techniques are described and claimed in the co-pending applications of Harold T. Lyman and Harold J. Yanosik, Serial No.

486,336, filed February 7, 1955, now Patent No. 2,854,-386, and of Harold J. Yanosik, Serial No. 450,751, filed August 18, 1954, now abandoned.

The circuit-printing techniques employed in applying the ribbon conductor 21 to the tape 22 may involve photographic printing or the application of etch-resisting inks by lithographic or other mechanical printing methods. In other words, any of the known circuit-printing techniques may be employed in practicing the method of this invention.

It is also possible to preform the conductive ribbon 21 and apply it to the supporting tape 22 under pressure, with or without the application of heat to soften the tape.

In accordance with the first exemplary method, adhesive is applied to the reverse or opposite side of the supporting tape 22 in order to form a bond between successive layers of the tape when the tape is coiled into a roll. The adhesive also supports the ribbon conductor in the finished coil after most of the tape has been dissolved by a solvent. In this instance, the adhesive takes the form of a zigzag ribbon 23 which follows and underlies the ribbon conductor 21. As shown, two additional adhesive ribbons 24 are applied to the reverse side of the tape 22 along the edges thereof. However, in many cases it is feasible to dispense with the ribbons 24.

In the first exemplary method, the adhesive ribbons 23 and 24 preferably include a solvent-resisting agent so that the adhesive ribbons will be left relatively unaffected when a solvent is applied, subsequently in the method, to dissolve away the tape 22. One such solvent-resisting agent is furfurol alcohol, for example, which may be embodied in the material making up the ribbons 23 and 24. Alternatively, the adhesive ribbons 23 may be applied in two layers. The first layer is then made of a material containing a solvent-resisting agent, while the second layer may be composed primarily of an effective adhesive agent. Another manner of rendering the adhesive solvent-resisting is to incorporate an inert material such as talc, for example, in the adhesive. Moreover, furfurol alcohol is only one example of many known solvent-resisting agents which may be incorporated in the adhesive.

It is preferred to employ a suitable pressure-sensitive adhesive in the adhesive ribbons 23 and 24. However, various heat-sensitive or solvent-sensitive adhesives may also be employed.

Figures 3, 5:
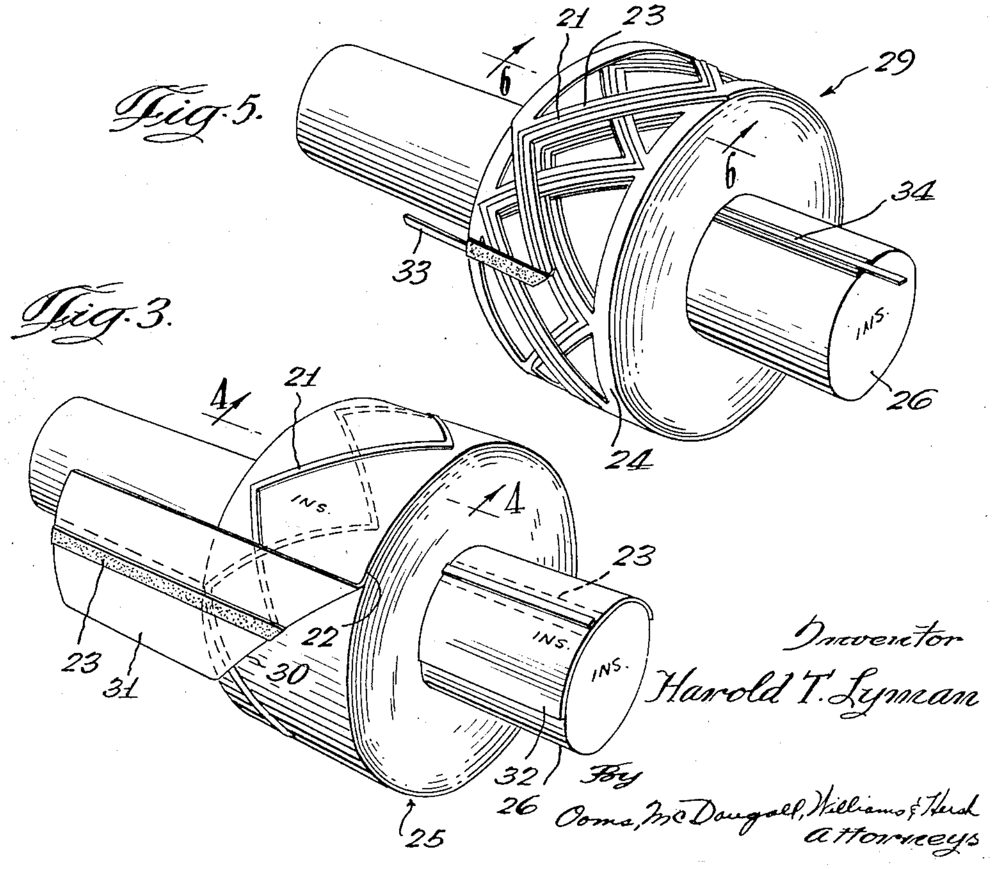
Fig. 3 is a perspective view showing the tape of Fig. 1 coiled into a roll, in accordance with the first exemplary method.
Fig. 5 is a perspective view of the roll of Fig. 3 after being subjected to the action of a solvent so as to dissolve away most of the supporting tape.

In accordance with the first exemplary method, the conductor 21 is formed into a coil by coiling the tape 22 into a roll 25 (Fig. 3). The tape may be wound on an insulating form or spindle 26. It will be appreciated that the adhesive ribbons 23 and 24 will form a bond between adjacent layers or turns of the roll 25 and thereby will prevent the tape from uncoiling.

Figure 4:
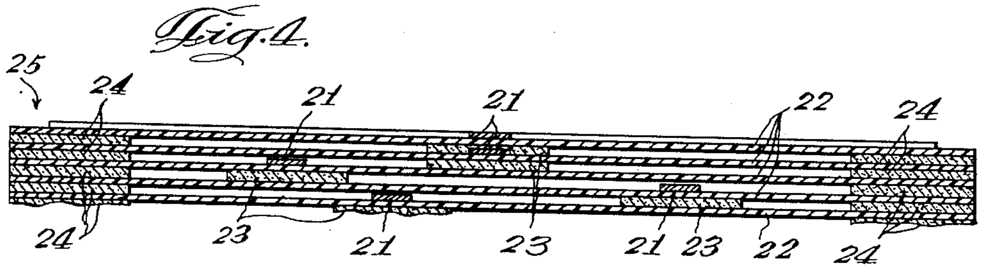
Fig. 4 is an enlarged somewhat diagrammatic cross-sectional view through the roll of Fig. 3, generally along a line 4—4.

As indicated in Fig. 4, the ribbon conductor 21 may become imbedded to a greater or lesser degree in the overlying elements of the adhesive ribbon 23 at points where the conductor and the ribbon cross.

The next step in the first exemplary method is to take whatever steps are necessary or desirable to render the adhesive ribbons 23 and 24 solvent-resisting to the maximum practicable extent. In the case of furfurol alcohol, this is accomplished by applying heat to the roll 25 so as to polymerize the alcohol. Of course, the temperature of the coil 25 is kept below the softening temperature of the supporting tape 22 so that the mechanical integrity of the roll will be maintained.

Next, the roll 25 is subjected to the action of a solvent capable of dissolving the supporting tape 22. Where the tape 22 is made of polyethylene the solvent may be acetone, for example. The solvent should be one that is selective between the material of the tape and the solvent-resisting material of the adhesive ribbons 23 and 24.

Figures 6, 7:
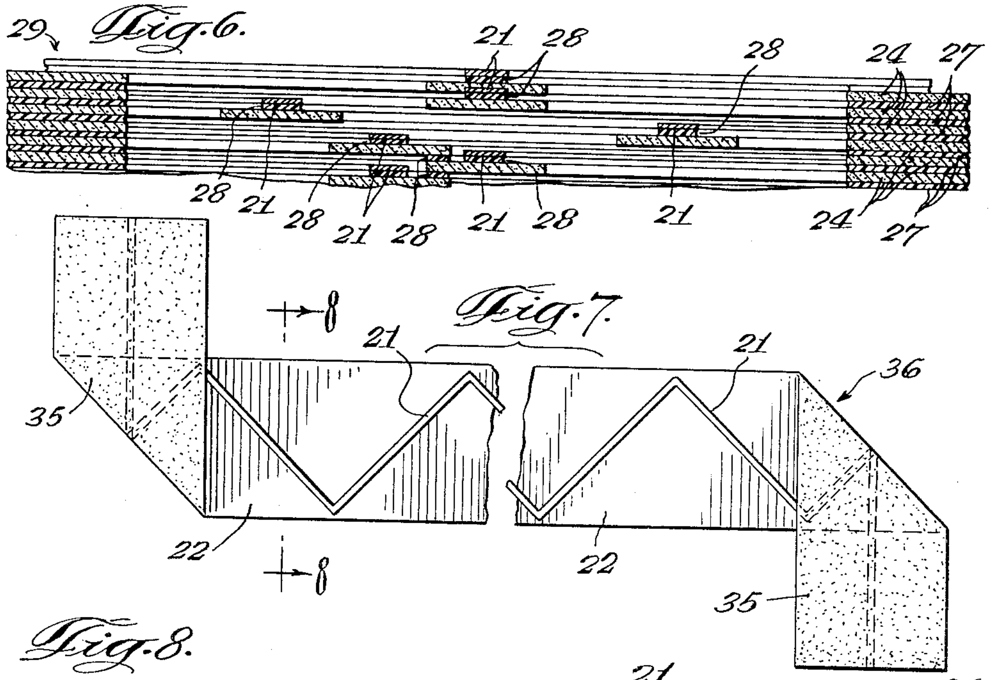
Fig. 6 is an enlarged somewhat diagrammatic cross-sectional view through the roll of Fig. 5, generally along a line 6—6.
Fig. 7 is a plan view of a tape employed in a second exemplary method.

As clearly indicated in Figs. 5 and 6, the solvent dissolves all portions of the supporting tape 22, except for those portions protected on both sides by the ribbon conductor 21 or the adhesive ribbons 23 and 24. Thus, residual elements 27 of the tape 22 are left at the edges of the coil where the tape is protected by the successive layers of the adhesive ribbons 24. Residual elements 28 of the tape 22 are also left in a zigzag pattern underlying the ribbon conductor 21. These tape elements 28 are protected on one side by the conductor 21 and on the other side by the adhesive ribbon 23.

It will be apparent that the finished coil comprises the zigzag ribbon conductor 21, supported and insulated by the residual zigzag tape elements 28, and held together by the adhesive ribbons 23 and 24. The finished coil is designated 29 in Fig. 5.

In forming the coil 29 by the first exemplary method, the ends of the ribbon conductor 21 are brought out, so as to form end terminals, by folding the ends of the tape 22 along diagonal fold lines 30. In this way, axially extending end tabs 31 and 32 are formed. When the supporting tape 22 has been dissolved, the ends of the ribbon conductor 21 remain to define terminal leads 33 and 34.

The finished coil 29, produced by the first exemplary method, has low distributed capacitance because of the removal of most of the dielectric tape 22. The remaining tape elements 27 and 28 and adhesive elements 23 and 24 do not increase the distributed capacitance unduly. Moreover, these remaining dielectric elements have very little adverse effect upon the "Q" of the coil. Nevertheless, the remaining tape and adhesive elements are sufficient to give the coil adequate mechanical strength.

A second exemplary method is illustrated in Figs. 7–10. Insofar as the second method is the same as the first, the same reference characters will be employed.

In accordance with the second method, the ribbon conductor 21 is applied to the supporting tape as in the first method. However, a continuous coating or layer 35 of adhesive is applied to the reverse side of the tape 22. In this instance, the adhesive layer 35 need not be entirely resistant to the solvent which is to be employed in dissolving the supporting tape 22. The solvent-resistance of the adhesive layer 35 may be comparable to that of the tape 22. Again, it is preferred to employ pressure-sensitive adhesive in the adhesive layer 35, although other forms of adhesive may be employed in some applications.

Figure 8:
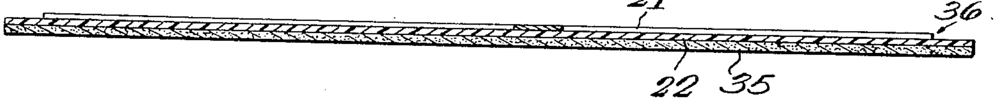
Fig. 8 is a somewhat diagrammatic cross-sectional view taken generally along a line 8—8 in Fig. 7.
Figure 9:
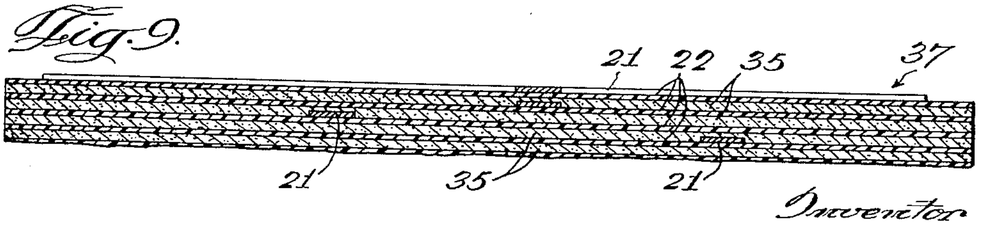
Fig. 9 is a somewhat diagrammatic enlarged cross-sectional view showing the tape of Fig. 7 coiled into a roll.
Figure 10:
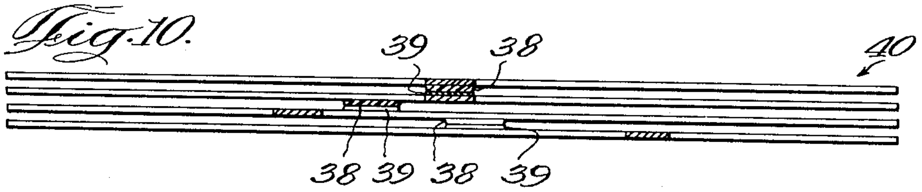
Fig. 10 is a view somewhat similar to Fig. 9, showing the roll of Fig. 9 after being subjected to the action of a solvent.

The entire tape assembly, designated 36 in Figs. 7 and 8, is coiled into a roll 37, shown in fragmentary cross-sectional fashion in Fig. 9. As indicated, the ribbon conductor 21 may become imbedded, at least partially, in the adhesive layer 35. It will be understood that the adhesive layer 35 holds the adjacent turns of the roll together and prevents uncoiling of the tape assembly 36.

In accordance with the second method, the roll 37 is subjected for a limited time to the action of a solvent capable of dissolving the tape 22. In this case, the solvent is also capable of dissolving the adhesive layer 35. Thus, all portions of the tape 22 and the adhesive layer 35 are dissolved with the exception of those portions protected on both sides by the ribbon conductor 21. Such portions occur only at the cross-over points between succesive turns of the conductor 21. Only the edges of these portions are exposed to the solvent. The residual tape elements are designated 38 in Fig. 10, while the residual adhesive elements are shown at 39. The finished coil as a whole is designated 40. It will be understood that the solvent is applied to the coil for a time which is sufficient to dissolve all of the unprotected areas of the tape and the adhesive, but is insufficient to dissolve the protected residual elements 38 and 39.

It will be apparent that the coil 40 produced by the second exemplary method embodies a minimum amount of dielectric material. Accordingly, the distributed capacitance of the coil is minimized while a high value of "Q" is obtained. Nevertheless, the mechanical integrity of the coil is maintained, inasmuch as tape and adhesive elements are present at each of the cross-over points between adjacent turns of the ribbon conductor.

A third exemplary method is illustrated in Figs. 11–17. The third method is adapted to producing a more complicated coil 41 (Fig. 15) having three adjacent windings in the form of pies 42, 43 and 44. It will be observed that the windings 42 and 44 resemble universally wound wire coils, while the winding 43 resembles a multi-layer solenoid-type coil.

To produce this type of multi-winding coil, the third exemplary method employs a supporting tape 45 which is wider than, but otherwise may be the same as, the tape 22 employed in the first and second methods.

To form the universally wound coils 42 and 44, two zigzag ribbon conductors 46 and 47 are applied to the front of the supporting tape 45 by circuit printing or other suitable techniques. In this instance, the zigzag conductors 46 and 47 are disposed adjacent the edges of the tape 45.

The multi-layer solenoid type coil 43 is formed by a plurality of linear conductors 48 extending in closely spaced parallel relation. In this instance, the straight conductors 48 are applied to the front of the tape 45 between the zigzag conductors 46. Six of the straight conductors 48 are employed in the illustrated embodiment.

In accordance with the third exemplary method, adhesive ribbons 49, 50 and 51 are applied to the opposite side of the tape 45 from the conductors 46, 47 and 48. As in the first exemplary method, the adhesive ribbons 49 and 50 define zigzag patterns which follow and underlie the zigzag conductors 46 and 47. The adhesive ribbon 51 is sufficiently wide to underlie all of the parallel linear conductors 48.

Figures 11, 12:
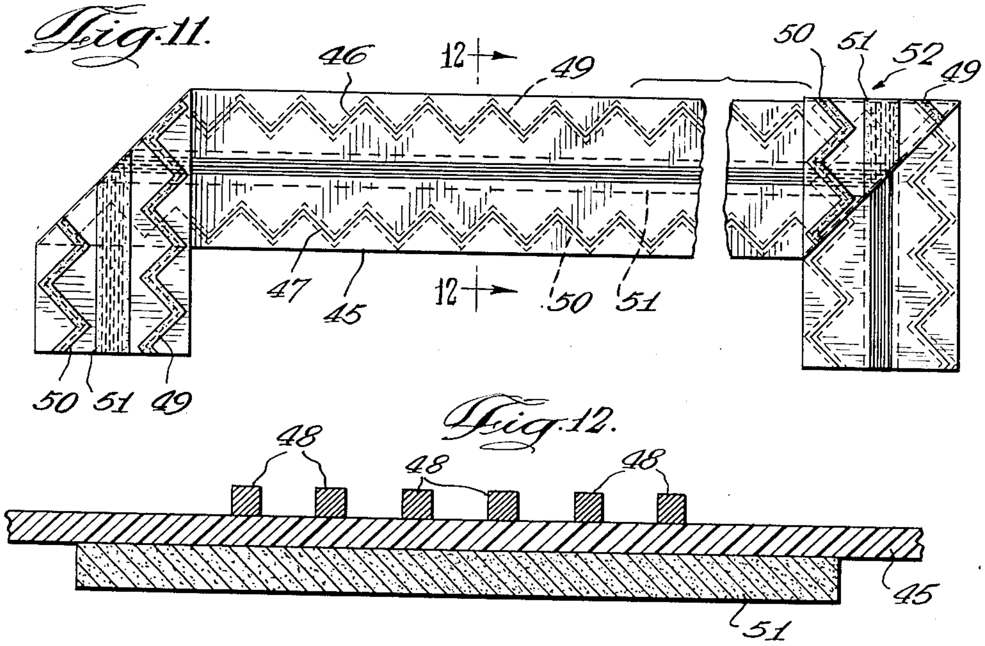
Fig. 11 is a plan view of a conductor-carrying tape employed in a third exemplary method.
Fig. 12 is a fragmentary enlarged cross-sectional view taken through the central portion of the tape of Fig. 11, generally along a line 12—12.
Figure 13:
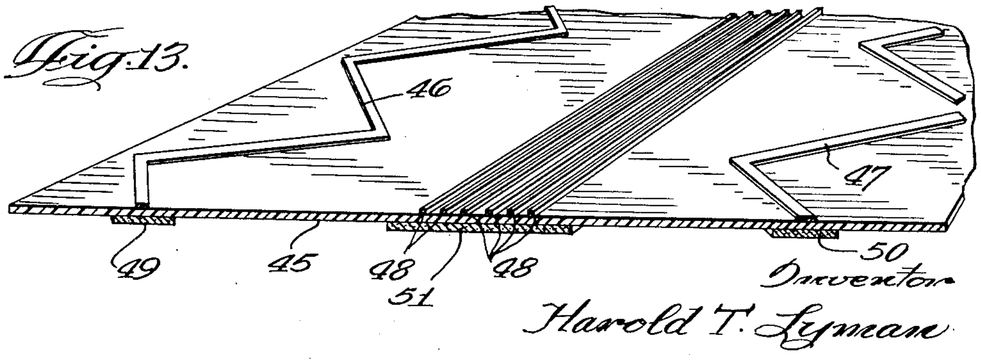
Fig. 13 is a greatly enlarged cross-sectional perspective view of the tape shown in Fig. 11.
Figures 14, 15:
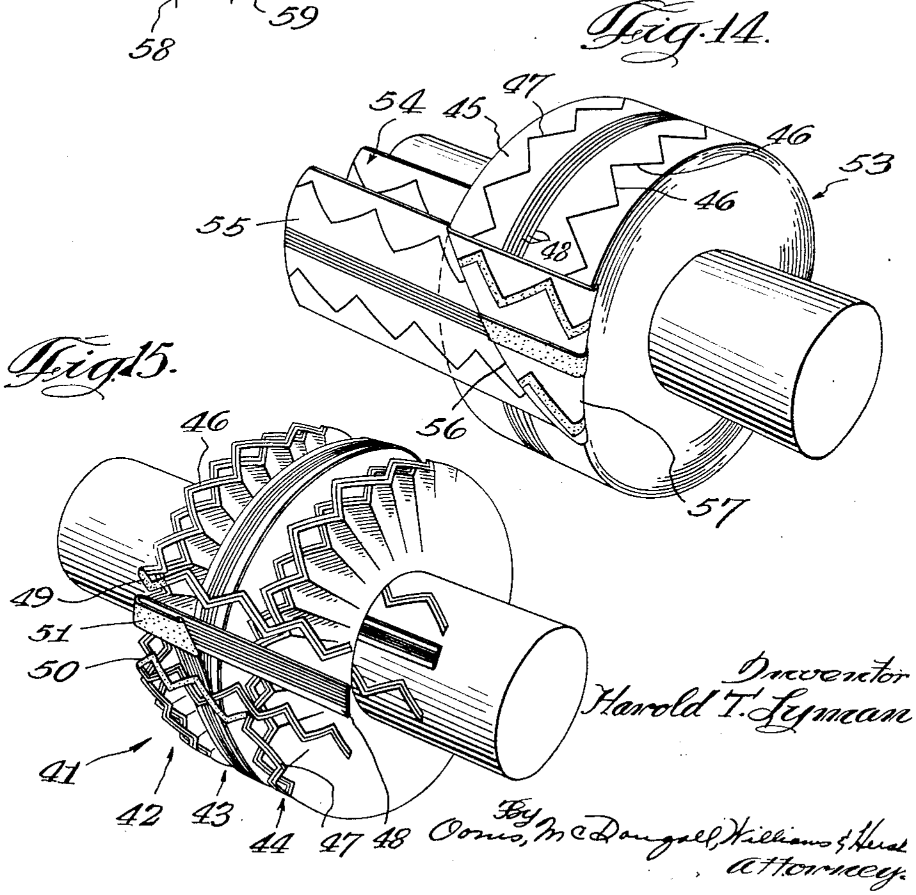
Fig. 14 is a perspective view showing the tape of Fig. 11 wound into a roll.
Fig. 15 is a perspective view of the roll of Fig. 14 after being subjected to the action of a solvent.

The entire tape assembly, designated 52 in Fig. 11, is wound into a roll 53, as shown in Fig. 14. As in the first method, the ends of the tape assembly 52 are folded to define end tabs 54 and 55. However, in this instance it is desired to interconnect the straight conductors 48 so as to form a continuous winding. To this end, the end tab 55 is first folded diagonally along a fold line 56 and then is double backed on itself along a circumferential fold line 57. The other end tab 54 is simply folded diagonally, as in the first method. In this way, the tabs 54 and 55 are brought out in the same axial direction and with the conductors 48 of the two tabs arranged in the same order.

Figure 16:
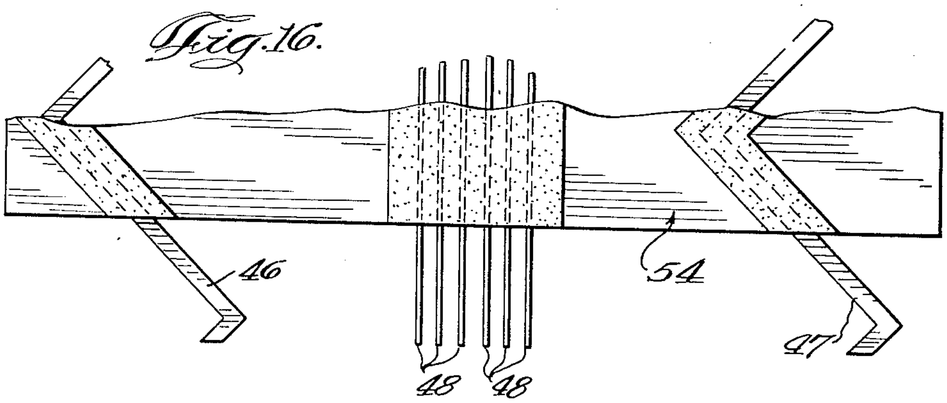
Fig. 16 is a greatly enlarged plan view of one end of the tape of Fig. 11, viewed at an intermediate stage in the third exemplary method.

To facilitate interconnection of the linear conductors 48, the end tabs 54 and 55 are partially immersed in a solvent so as to remove the immersed portions of the tape 45 and the adhesive ribbons 49—51. The ends of the conductors 46, 47 and 48 are left free, as shown in Fig. 16.

Figure 17:
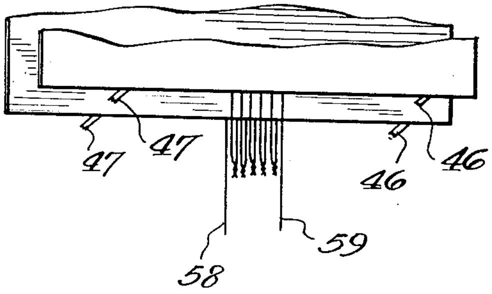
Fig. 17 is a fragmentary plan view of the opposite ends of the tape of Fig. 11 with certain of the conductors, carried by the tape, connected together in accordance with the third exemplary method.

The ends of the linear conductors 48 are interconnected simply by bringing the two tabs 54 and 55 together in slightly staggered relation, as shown in Fig. 17. The finishing end of the first linear conductor 48 is thereby aligned with the starting end of the second conductor 48 so that these ends may readily be connected together. Likewise, the finishing end of the second linear conductor 48 is aligned with the starting end of the third conductor 48, and so forth. The interconnected ends of the conductors 48 may be soldered simultaneously by a dipping operation. The starting end of the first conductor 48 and the finishing end of the last conductor 48 define end leads 58 and 59. All of the coil conductors 48 are connected in series between these leads 58 and 59.

In the third exemplary method the adhesive ribbons 49, 50 and 51 preferably comprise solvent-resisting material as in the first method. If necessary, the solvent-resisting material is polymerized by the application of heat after the roll 53 has been formed.

The coil 41 is finished by subjecting the roll 53 to the action of a solvent capable of dissolving the tape 45, as in the first and second methods. The adhesive ribbons 49, 50 and 51 resist the action of the solvent and are left in the finished coil. All of the tape 45 is dissolved, except for those portions sandwiched between the conductors 46, 47 and 48, on one hand, and the adhesive ribbons 49, 50 and 51, on the other. Accordingly, very little dielectric material is present in the finished coil, although sufficient material is retained to maintain the mechanical integrity of the coil.

It will be appreciated that virtually any desired type of coil may be produced in accordance with the invention. In the case of universally wound coils, the zigzagging of the conductors may be varied along the length of the supporting tape so that a predetermined number of cross-overs per turn may be maintained as the diameter of the coil increases. This will ordinarily provide a coil having extremely high "Q." It will be understood that any other variation in the frequency of the crossovers may be obtained simply by varying the pattern of the printed conductor. Circuit-printing techniques permit such variation in the conductor pattern at low cost. This is particularly true of photographic circuit-printing techniques.

Since the coil is wound initially with the aid of a supporting tape, extremely wide lateral "throws" may be utilized in universal type coils. In this way coils having low distributed capacitance may be produced. The mechanical integrity of such wide throw coils will be fully adequate.

Various other modifications, equivalents and alternatives may be employed without departing from the true spirit and scope of the invention as exemplified in the foregoing description and defined in the following claims.

I claim:

1. A method of making an inductance coil, said method comprising applying a conductor in a thin zig-zag ribbon to one side of a length of thin resinous plastic tape, applying adhesive to the opposite side of said tape, said adhesive being applied at least to the portions of said tape underlying said zig-zag ribbon conductor, winding said tape into a roll, applying a solvent to substantially the entire roll until said solvent dissolves substantially all exposed portions of said tape not protected by said zig-zag ribbon conductor, and then terminating the application of solvent to said roll, said adhesive having a resistance to said solvent at least comparable to the resistance of said tape to said solvent.

2. A method of making an inductance coil, said method comprising applying a ribbon conductor to one side of a polyethylene tape, applying pressure-sensitive adhesive containing furfurol alcohol as a solvent-resisting element to the opposite side of said tape in a ribbon following the path of said ribbon conductor and in underlying relation thereto, winding said tape into a roll, applying heat to said roll to polymerize said furfurol alcohol and thereby render it solvent-resisting, applying acetone to substantially the entire roll until said solvent dissolves substantially all exposed portions of said tape not protected by said ribbon conductor and said adhesive, and then terminating the application of said acetone to said roll.

3. A method of making an inductance coil, said method comprising applying a conductor in a thin zig-zag ribbon to one side of a length of thin resinous plastic tape, applying adhesive to substantially the entire opposite side of said tape, including the portions thereof underlying said conductor, winding said tape into a roll, applying a solvent to substantially the entire roll until said solvent dissolves substantially all exposed portions of said tape not protected by said zig-zag ribbon conductors and then terminating the application of solvent to said roll, said adhesive having a resistance to said solvent at least comparable to the resistance of said tape to said solvent.

4. A method of making an inductance coil, said method comprising applying a thin ribbon-like conductor in a predetermined pattern to one side of a length of thin resinous plastic tape, applying solvent-resisting adhesive to the opposite side of said tape in a pattern following the path of and underlying said ribbon conductor, winding said tape into a roll, applying a solvent to substantially the entire roll until said solvent dissolves substantially all exposed portions of said tape not protected by said conductor and said adhesive, and then terminating the application of solvent to said roll.

5. A method of making an inductance coil, said method comprising applying a conductor in a thin zig-zag ribbon to one side of a length of thin resinous plastic tape, applying solvent-resisting adhesive to the opposite side of said tape in a pattern following the path of and underlying said ribbon conductor, winding said tape into a roll, applying a solvent to substantially the entire roll until said solvent dissolves substantially all exposed portions of said tape not protected by said zig-zag ribbon conductor and said adhesive, and then terminating the application of solvent to said roll, said adhesive having a resistance to said solvent substantially greater than the resistance of said tape to said solvent.

References Cited in the file of this patent

UNITED STATES PATENTS

| | | |
|---|---|---|
| 1,693,837 | Currier | Dec. 4, 1928 |
| 1,825,105 | Terman | Sept. 29, 1931 |
| 1,844,108 | Smythe | Feb. 9, 1932 |
| 2,434,511 | Osterman et al. | Jan. 13, 1948 |
| 2,455,355 | Combs | Dec. 7, 1948 |
| 2,699,424 | Nieter | Jan. 11, 1955 |
| 2,728,693 | Cado | Dec. 27, 1955 |

FOREIGN PATENTS

| | | |
|---|---|---|
| 639,591 | Great Britain | June 28, 1950 |